Figure 2:
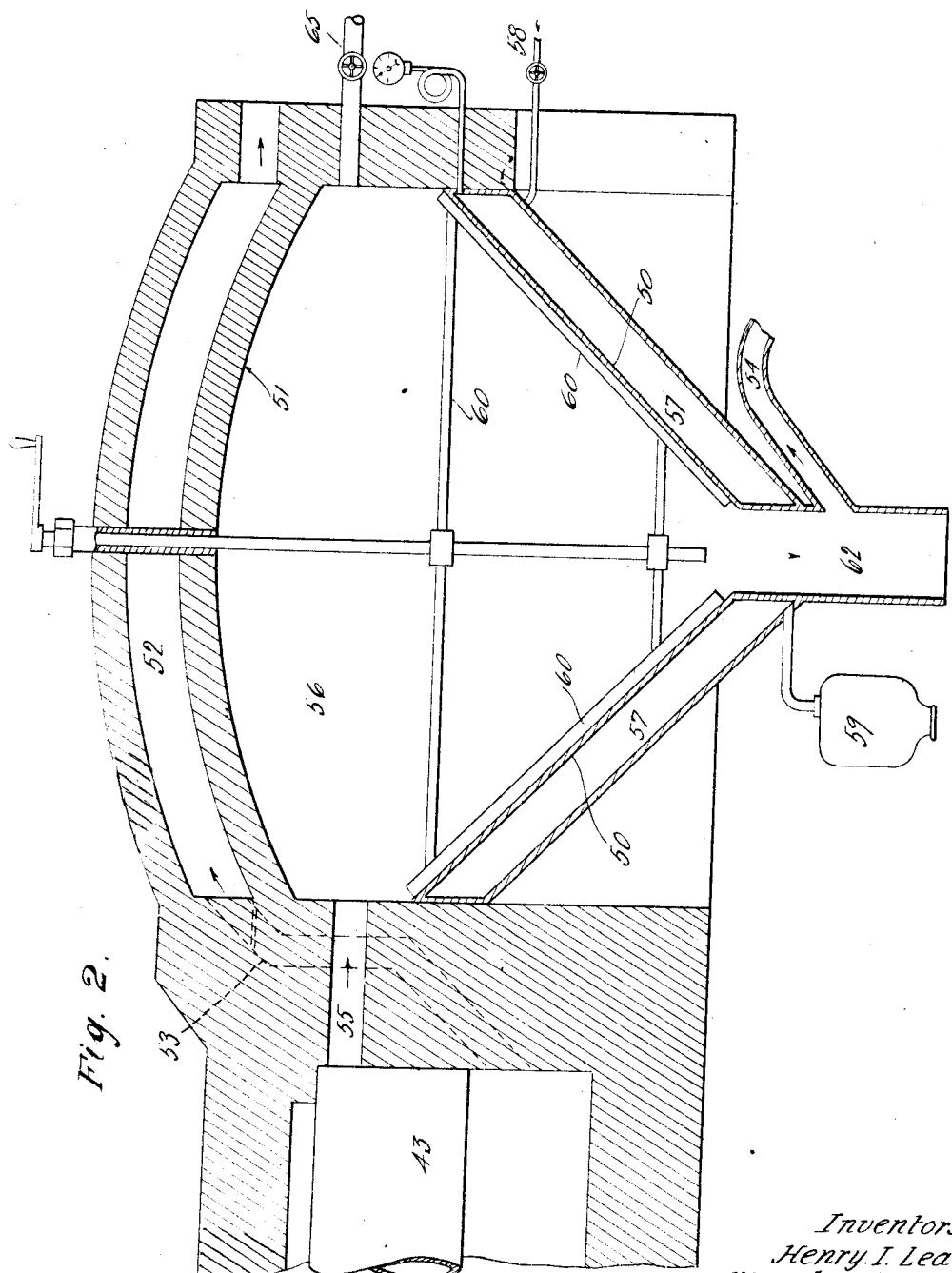

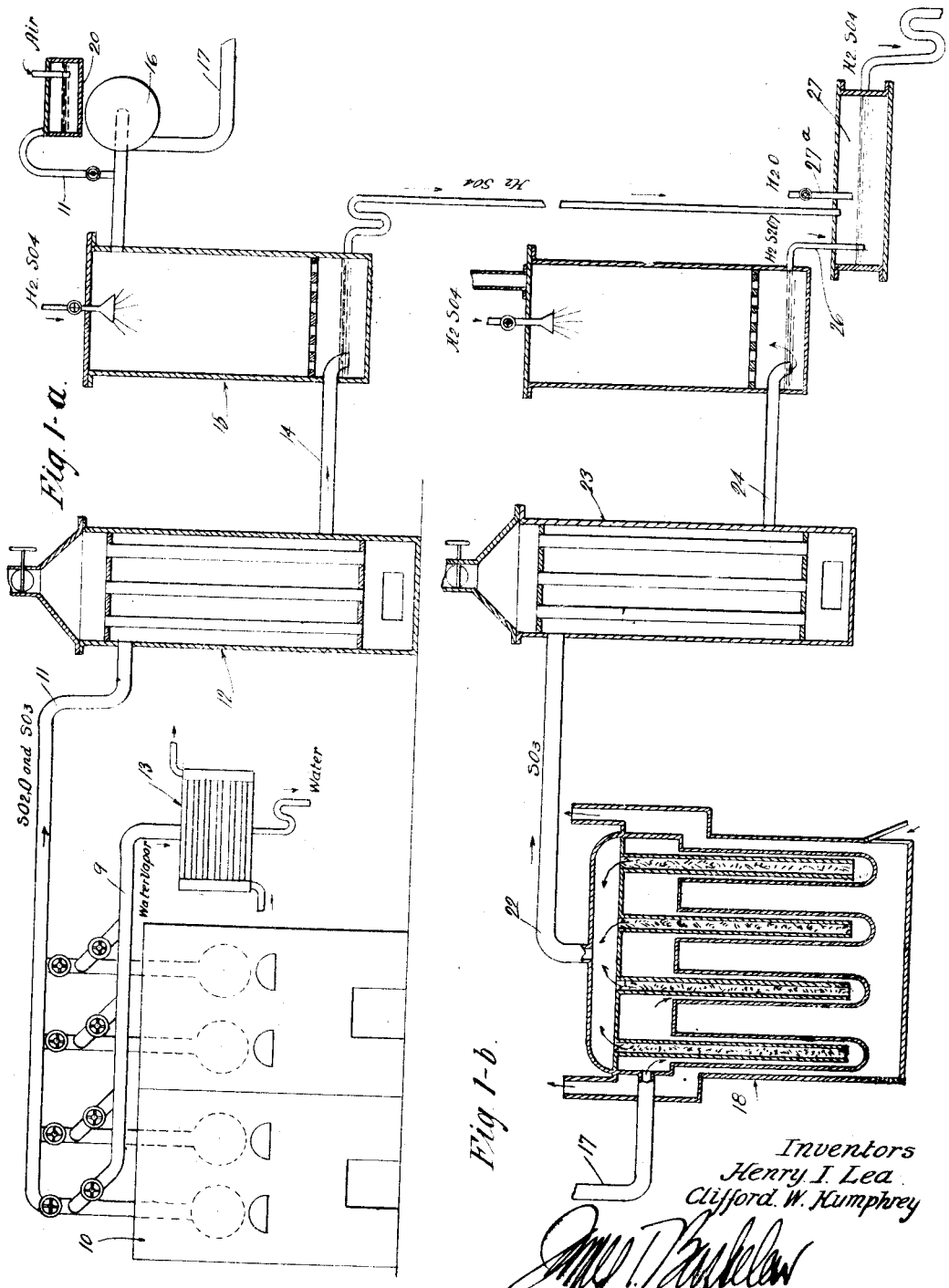

Oct. 25, 1927.
H. I. LEA ET AL
1,646,732
ALUMINUM CHLORIDE PROCESS
Original Filed June 20, 1923  3 Sheets-Sheet 2
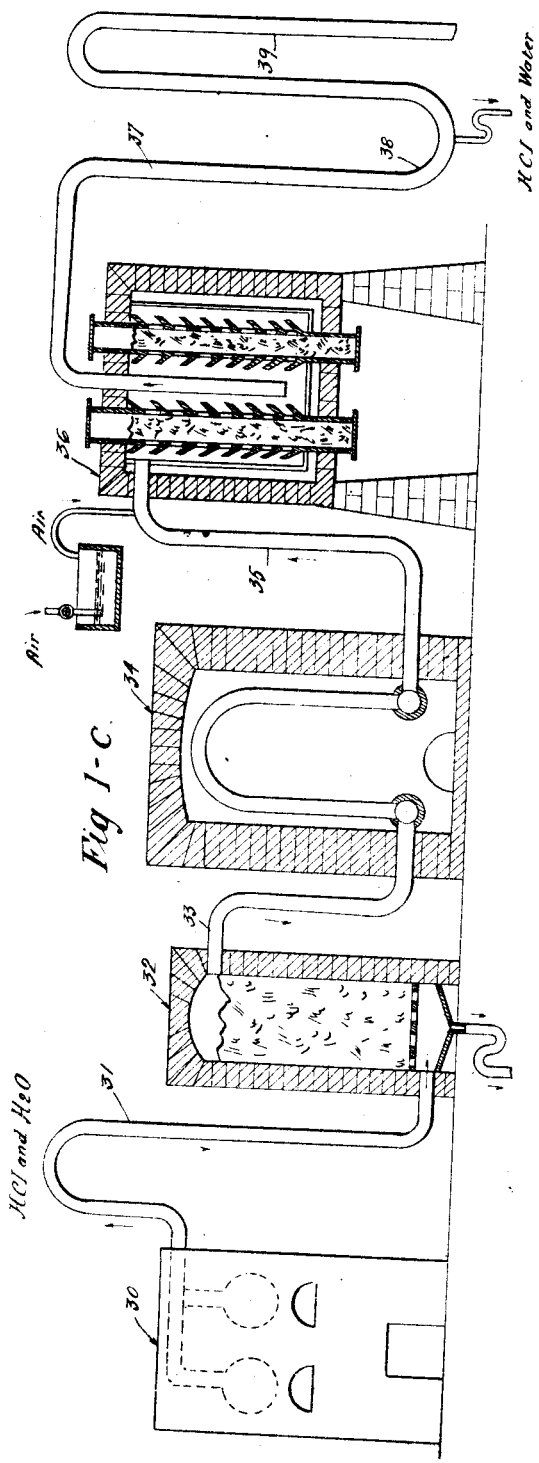
Fig. 1-c.
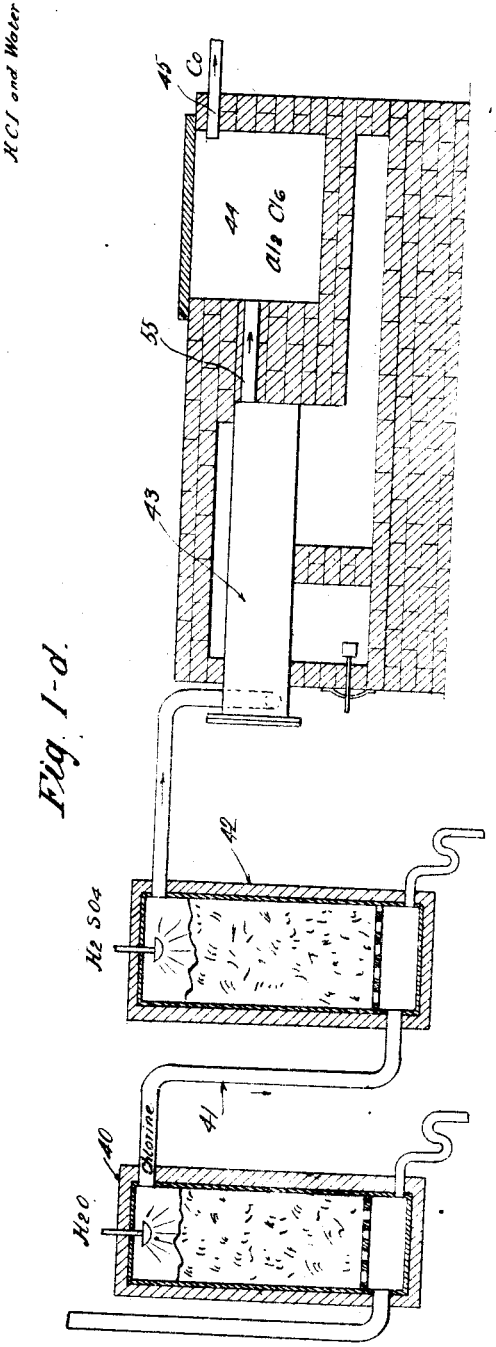
Fig. 1-d.
Inventor
Henry I. Lea
Clifford W. Humphrey
Attorney Oct. 25, 1927.   1,646,732
H. I. LEA ET AL
ALUMINUM CHLORIDE PROCESS
Original Filed June 20, 1923   3 Sheets-Sheet 3

Inventors
Henry I. Lea.
Clifford W. Humphrey
Attorney.

Patented Oct. 25, 1927.

1,646,732

UNITED STATES PATENT OFFICE.

HENRY I. LEA, OF SANTA MONICA, CALIFORNIA, AND CLIFFORD W. HUMPHREY, OF RED BANK, NEW JERSEY.

ALUMINUM-CHLORIDE PROCESS.

Application filed June 20, 1923, Serial No. 646,555. Renewed March 16, 1927.

This invention relates to processes for the production, principally of aluminum chloride. The present general object of the invention concerned in this application and in several copending and companion applications, hereinafter identified, is the economical production of anhydrous aluminum chloride (hereinafter referred to simply as aluminum chloride); but the process as hereinafter described also produces other products of some value. Consequently, although aluminum chloride is the most valuable product of the process at present, and although for that reason we term our process one for producing aluminum chloride, it is not to be understood that it may not be an object, or perhaps under other conditions the principal object, to produce one or more of the other products of the process.

There are various procedures, differing somewhat from each other, by which our process may be carried out; and the process as a whole will be best understood from the following detailed descriptions of preferred methods, rather than from any general statement that we may make in advance. However, for the purpose of generally distinguishing the processes of the several applications, from each other we will make a general and preliminary statement of the distinguishing features of the several variations. It will be understood, nevertheless, that this statement is not intended in the least as a restriction or limitation upon the invention, either as a whole or as to the specific aspects herein claimed, but is intended only to give a clear idea of the lines of demarkation between the several specific variations of the fundamental process and as between the specific claims of the several copending applications.

This application is in part a divisional continuation of our application on aluminum chloride process, filed May 31, 1922, Serial Number 564,762. In that application we have described a process including steps that may be said, in a broad way, to amount to the chlorination of a more or less dehydrated or a more or less dehydrated and decomposed aluminum sulphate; and the specific variations in the methods have to do with various ways and means of effecting successive operations; as for instance the ways and means of obtaining the chlorine for the chlorinating reaction, or the specific ways and means of treating the original aluminum sulphate, as to whether it is decomposed or not before being chlorinated.

When we refer herein to aluminum sulphate, it will be understood that we include that substance in whatever form it may be used. For instance it may be in ores that carry the sulphate in such associations that the ores themselves may be put directly into our process; or it may be in ores that require pre-treatment to separate certain other matters; or it may be in ores that may be put directly into the process and that may require one or two additional steps during the process. Such for instance is the ore alunite, an aluminum and potassium sulphate ore; and how alunite may be treated is hereinafter set out.

A typical form of the general process may, for the purposes of this preliminary general statement, be described as follows: We take an aluminum sulphate or an aluminum sulphate carrying ore, and if it has not been previously dehydrated, we first dehydrate it. Then by application of suitable temperature we decompose the sulphate into aluminum oxide and a sulphur and oxygen compound or compounds. For instance the sulphur and oxygen may either come off as $SO_3$ or as $SO_2$ plus O. Then we chlorinate that oxide that we have obtained by decomposing the sulphate. Just how and where the chlorine is preferably obtained, in the complete process, we will advert to later; as different methods of obtaining the chlorine, or different methods of chlorination, form some of the variations that are covered in the various applications. The chlorination is carried by subjecting the oxide, under a suitable temperature, to the action of chlorine in the presence of carbon. The chlorine may be, and preferably is, in most variations of this process, free chlorine; but, as we will set out, the chlorination step may be carried on without the necessity of first obtaining free chlorine. This will be adverted to later. Whatever may be the immediate chlorinating agency, chlorination, carried on in the presence of carbon, is preferably carried on in the presence of hydrocarbon, in the manner and with the resulting advantages as hereinafter explained. The process, in itself, of chlorinating an aluminum oxide or an aluminum oxide carrying ore, in the presence of hydrocarbons, is made the specific subject matter of the claims of said prior application, which, for identification, will be called application "A". This present application, which will be identified as application "B", has its claims directed characteristically to the chlorination of aluminum oxide that has been produced by decomposition of a sulphate or its equivalent; and also the combination of the foregoing with chlorination in the presence of hydrocarbon.

Various manners of obtaining the chlorine for chlorination; of using the S-and-O compound coming from decomposition of the original sulphate; or of chlorinating the sulphate directly, without first decomposing it; or decomposing it simultaneously with chlorination; are specifically subject matters of co-pending applications: Serial Numbers 646,556; 646,557; 646,558; and 646,559; all filed on even date herewith; the first and third mentioned having issued as Patents Nos. 1,558,897 dated October 27, 1925, and 1,546,289, dated July 14 1925. Of such subject matters we therefore no not specifically here treat: the description here being directed particularly to typical procedures in which an oxide, obtained by decomposition of the sulphate, is chlorinated. But it will not thereby be taken that the method here described is limited to the specific details stated, except as so specifically limited by the appended claims.

As will be readily understood, our process may be carried on in any suitable apparatus; and so it is only for the purpose of clarifying the following detailed description that we illustrate a suitable apparatus in the accompanying drawings. In these drawings there is a diagram which, for convenience of illustration, is divided into several figures as Fig. 1$^a$, Fig. 1$^b$, Fig. 1$^c$, Fig. 1$^d$; and Fig. 2 is a section showing a form of chloride condensing chamber that may be used as herein explained.

*Method 1.*

In the method that we shall describe first and which may be hereinafter referred to as method No. 1, we take aluminum sulphate, and, placing it in a retort 10 heat it to a temperature sufficient to drive off its water of crystallization; so that we have the reaction:

I. $Al_2(SO_4)_3 \cdot 18H_2O$ plus heat equals $Al_2(SO_4)_3$ plus 18 (or less) $H_2O$.

We may say here that less than the maximum amount of water may be driven off, because the sulphate does not always contain the maximum amount; and also because it may be that this reaction, like others in the process may sometimes not go through to absolute completion. This will be generally understood in connection with all the following.

The product here is a dehydrated aluminum sulphate that may be removed from time to time or preferably left in the retorts for the next decomposition reaction. The retorts 10 may be arranged singly, in pairs, or more in a set so as to provide for more or less continuous operation. The water vapor that passes off goes through pipe 9 into condenser 13 or may go directly to atmosphere.

Further application of heat to the dehydrated sulphate then causes it to break up into aluminum oxide, sulphur dioxide and oxygen (or the aluminum oxide and sulphur trioxide as hereinafter explained) as follows:

II. $Al_2(SO_4)_3$ plus heat equals $Al_2O_3$ plus $3SO_2$ plus $3O$ (or equals $Al_2O_3$ plus $3SO_3$.

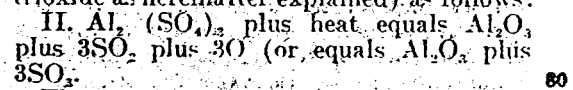

The temperature used for this reaction may vary; we have found that a red heat is suitable, and a dull red heat or even lower may be sufficient (say about 600° C. or above). The temperature used depends on the time element, the pressure (above or below atmosphere) maintained in the retort, and the extent of decomposition desired. We find that absolutely full decomposition is not necessary or practically desired.

The sulphur dioxide and oxygen from this operation pass through the pipe 11 to the cooler 12, which may be here an air or water cooler. The oxide may be removed from time to time to be put in the chlorinating retort; or chlorination, as hereinafter explained may be carried on in retorts 10.

Next the gases pass through pipe 14 to a drying and cleaning tower 15 of any suitable kind, through which the gases rise upwardly and through which sulphuric acid, or other drying medium, may be sprayed down from the top; and the gases next are drawn out by an exhauster 16 and passed through a pipe 17 into a catalyzer 18. At the same time this exhauster draws in atmospheric air through a valve controlled pipe 19, the air passing through a washer 20, to cleanse and dry it. Catalyzer 18 is preferably of the type utilizing platinized asbestos. In this catalyzer the uncombined sulphur dioxide and oxygen are combined to form sulphur trioxide according to:

III. $3SO_2$ plus $3O$ plus catalyzer equals $3SO_3$.

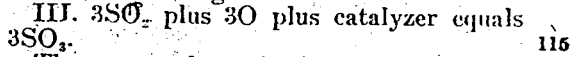

The oxygen theoretically required for this reaction may be fully supplied by the oxygen from the last proceeding reaction; but we find that an excess of oxygen (supplied here by the air) makes the reaction go on more fully.

The catalyzer may be kept at the most efficient temperature with air that passes through its air jacket 21; and the heated air that comes off the catalyzer may be used at any convenient place in the process, for instance, for combustion under one or more of the retorts. We find the best catalyzer temperature to be about 450° C.; it may be necessary in starting to warm the catalyzer, and then, when in operation, to somewhat cool it to maintain this temperature.

From the catalyzer 18 the sulphur trioxide passes through pipe 22 to another cooler 23 which may be either air or water cooled. We may state here that wherever a cooler is used in this process it may be desirable to use an air cooler as we thereby can more readily use the heat in the furnaces. From the cooler the sulphur trioxide passes through pipe 24 into an absorption tower 25. In the absorption tower the gases pass upwardly and sulphuric acid is sprayed downwardly; with the result that fuming sulphuric acid is formed, and this sulphuric acid collecting in the bottom of the tower passes out through pipe 26 into a storage chamber 27 to which water may be controllably fed through 27ª to change the fuming sulphuric into ordinary sulphuric of 66° B. gravity.

These reactions are thus represented: (if they go to completion)

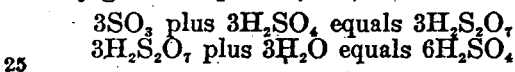

$3SO_3$ plus $3H_2SO_4$ equals $3H_2S_2O_7$
$3H_2S_2O_7$ plus $3H_2O$ equals $6H_2SO_4$ Half this sulphuric acid is put back into absorption tower 25, thus leaving half the sulphuric acid ($3H_2SO_4$) in 27. Thus the summation of these two reactions may be written:

IV. $3SO_3$ plus $3H_2O$ equals $3H_2SO_4$.

If conditions in retort 10 have been such as to produce $SO_3$ instead of $SO_2$ and O, or to partially produce $SO_3$, then that $SO_3$ will, with sulphuric acid in 15, become $H_2S_2O_7$. If $SO_3$ is produced entirely in retort 10, then catalyzer 18 and cooler 23 and absorption tower 25 can be dispensed with; the $H_2S_2O_7$ going directly from 15 to 27.

Then into a retort or salt cake pan 30 that is heated to about the same temperature as the first retort we introduce an alkali chloride, for instance, sodium chloride, and the sulphuric acid, in proper proportions for the following reaction which then takes place:

V. $3H_2SO_4$ plus $6NaCl$ equals $3Na_2 SO_4$ plus $6HCl$.

In this operation the chloride of sodium, potassium, calcium, magnesium or manganese may be used. If we use sodium chloride the result of this operation is to produce sodium sulphate and hydrochloric acid. The sodium sulphate is left in the retorts until the charge is exhausted while the hydrochloric acid gas passes through pipe 31 into a drying chamber 32. This drying chamber may be of brick construction, filled with coke. The dried hydrochloric acid vapor then passes through pipe 33 into a heater 34. This heater may be heated with waste gases from the retorts. Then the dry heated HCl gas passes through pipe 35 to the second catalyzer 36 charged with broken brick, coke, pumice stone, or other suitable material well soaked with a solution of $CuCl_2$, or other suitable catalyzing material. This catalyzer 36 is kept at a temperature of about 450° C., and also there is supplied to this catalyzer a suitable amount of air or oxygen so that the following takes place:

VI. $6HCl$ plus $3O$ plus catalyzer equals $3H_2O$ plus $6Cl$.

The vapors and gases pass off through a pipe 37 which has a condensation bend 38 where the water is condensed and any remaining HCl is thus taken off in solution and then the chlorine gas passes through pipe 39 into a tower 40. This is a wooden tower lined with lead and filled with coke, and sprayed with water to cleanse the gases and absorb any remaining HCl. Thence the gases pass through pipe 41 into a similar tower 42 which is sprayed with sulphuric acid to dry the gases. Thence the gases are lead to a retort 43' which is heated by any suitable means to a temperature of about red heat, (say about 600° C. or more). And into this retort is also introduced carbon and the $Al_2O_3$ that has been produced in retorts 10 when the dehydrated aluminum sulphate has been broken up by heat. The carbon and $Al_2O_3$ are ground and thoroughly mixed to give intimate contact and briquetted if found desirable to prevent being carried over mechanically into the condensing chamber. The following reaction then takes place;

VII. $Al_2O_3$ plus $3C$ plus $6Cl$ plus heat equals $Al_2Cl_6$ plus $3CO$.

The result is the production of carbon monoxide gas and anhydrous aluminum chloride in vapor form. This aluminum chloride as fume passes into a sublimating chamber 44 where the aluminum chloride sublimes and the carbon monoxide passes off through a pipe 45. This carbon monoxide may be used, for instance, as fuel in any of the various furnaces.

It may be desirable to control the temperature of the aluminum chloride so as to control its final physical form; and in Fig. 2 we have shown one form of apparatus suitable for that purpose. The chloride vapors from retort 43 enter a chamber 56 through pipe 55. This chamber has a brick top 51 heated by a heating jacket 52 receiving waste gases from combustion under the retort, and whose temperature may be controlled by any suitable damper arrangement, for instance. The conical bottom 50 of chamber 56 is steam jacketed at 57, steam (or other vapor) being admitted at 58 and exhausted through a trap at 59. By controlling the pressure any selected temperature may be maintained at the conical floor of chamber 56. A revoluble scraper 60 serves to scrape the chloride off floor 50 to drop through outlet 62 into receiver 63. The residual gases (CO) pass out through 14. Cool inert gases (for instance, CO or N) may be introduced at 65. The various operations follow:

(a) Pass cool gas through 52, air cool the jacket 57 and introduce cool gas at 65, and then all or practically all the chloride will be sublimated in finely divided form.

(b) Heat top of chamber so that inside temperature is above the boiling point of the choloride, which is about 183° C. Floor 50 is maintained slightly below the melting point (178° C.); and then the major portion of the chloride will be thrown down as a crystal.

The device above described also forms one means for obtaining fractional condensation separation of certain final products of certain methods herein described. For instance, where aluminum chloride and certain sulphur compounds are final products, they may be at least partially separated by maintaining the proper temperatures in the chamber, its roof and floor; or, of course, they may be separated in any of the well known frictional condensation systems.

Summing up this method it will be seen that we use as initial materials aluminum sulphate or sulphate bearing ores, etc. (Equation I); sodium chloride (Equation V); and carbon (Equation VII.) The ultimate products are sodium sulphate (Equation V); aluminum chloride (Equation VII); and carbon monoxide (Equation VII). The ultimate thing that is done is the chlorination of the oxide obtained by dehydrating and decomposing aluminum sulphate. In the particular procedure described we obtain the chlorine for the chlorination from hydrochloric acid which in turn is formed from sulphuric acid and sodium chloride, and the sulphuric acid is formed from the sulphur dioxide and oxygen (and/or $SO_3$) that are driven off when the aluminum sulphate is reduced to aluminum oxide; and these particular things, with their variations, form more particularly the subject matter of application "C", hereinabove identified. However, as such variations may form a part of the process as practically carried out, we mention typical ones. For instance, we have found that if an atmosphere of $SO_3$ is maintained in the initial retort 10 and held under a suitable pressure (we have found a pressure of about twelve pounds above atmosphere to be sufficient at the temperature we have employed) then, instead of the product being aluminum oxide and sulphur dioxide and oxygen, the product is aluminum oxide and $SO_3$ (a temperature of about red heat is maintained and the pressure keeps the $SO_3$ from breaking up). Under these conditions the next operation (Equation III) may be dispensed with; and the $SO_3$ may then immediately be put into the operation represented by Equation IV to form sulphuric acid as has been touched upon before; or the $SO_3$ thus formed may be put directly into the operation represented by Equation V, into retort 30 along with the sodium chloride and water to form sodium sulphate and hydrochloric acid. Furthermore, it is possible here to dispense with the water and thus to obtain sodium sulphite and chlorine direct instead of sodium sulphate and HCl and thus the next step (Equation IV) and the step of Equation VI may be dispensed with.

Generally speaking, we find that as our process involves the chlorination of aluminum oxide obtained by decomposition of dehydrated aluminum sulphate, we can carry on the operations at much lower temperatures than any other process of which we are aware; and we find also that such decomposed sulphate lends itself very readily to easy chlorination. It will be understood that in all forms of our process, anhydrous aluminum sulphate may be the starting point of our actual operations; the sulphate may be dehydrated previously.

Method 2.

In this method we dehydrate and break up the aluminum sulphate in the same manner as before described;

I. $Al_2(SO_4)_3 . 18H_2O$ plus heat equals $Al_2(SO_4)_3$ plus $18H_2O$.

II. $Al_2(SO_4)_3$ plus heat equals $Al_2O_3$ plus $3SO_2$ plus 30 (or equals $Al_2O_3$ plus $3SO_3$.

Then as the next step we introduce the sulphur dioxide, and oxygen gases, with or without extra oxygen, and water (steam) and the sodium chloride into a heating chamber (such for instance as shown at 30) with the result of forming hydrochloric acid and sodium sulphate as follows:

III*. $3SO_2$ plus 30 plus air plus $3H_2O$ plus heat plus $6NaCl$ equals $6HCl$ plus $3Na_2SO_4$.

This brings us to the same point as at the end of Equation V in Method 1.

The remaining operations are the same as in Method I as follows:

VI. $6HCl$ plus 30 plus catalyzer equals $6Cl$ plus $3H_2O$.

VII. $Al_2O_3$ plus $6Cl$ plus 30 equals $Al_2Cl_6$ plus 3CO.

It will be seen that this variation from Method 1 is somewhat similar to the variation previously explained for Method 1, in that the sulphur dioxide and oxygen from the breaking up of the aluminum sulphate are put directly into reaction with water and the sodium chloride without the intervening formation of sulphuric acid; and the retort 10 in this second method may be operated, as previously described, to produce sulphur trioxide. These variations are, more specifically, the subject matter of the application Serial No. 646,556, Patent No. 1,558,897, dated October 27, 1925; although they also apply to the process of chlorinating a decomposed sulphate, which is the general subject matter of this present application.

We may say here, that in the operation of retorts 30 we may arrange and connect them so that the gases are passed through several in series, one cylinder being always disconnected from the series line to remove spent material and to charge a fresh. The fresh cylinder is then connected into first position in the line. In this way almost complete reactions may be obtained.

Method 3.

In Method 3 the first step is the same as before described:

I. $Al_2(SO_4)_3.18H_2O$ plus heat equals $Al_2(SO_4)_3$ plus $18H_2O$.

The second step however, involves putting the undecomposed aluminum sulphate directly into reaction with the sodium chloride and water (steam).

$II^a$. $Al_2(SO_4)_3$ plus $6NaCl$ plus $3H_2O$ equals $Al_2O_3$ plus $3Na_2SO_4$ plus $6HCl$.

This second step may be looked upon more or less as being a combination of stops II and $III^a$ of the second method, as it has the same ultimate ends; that is, the production of aluminum oxide, sodium sulphate, and hydrochloric acid. This reaction ($II^a$) is carried on a retort, such as 30, heated to about the temperature hereinbefore stated. The $Al_2O_3$ and $Na_2SO_4$ are separated by lixiviation and the oxide dried.

Then the last two steps.

VI. $6HCl$ plus air plus catalyzer equals $3N_2O$ plus $6Cl$ and

VII. $Al_2O_3$ plus $6Cl$ plus $3C$ equals $Al_2Cl_6$ plus $3CO$ are the same as the last two steps in the other two methods.

Here again we have another variation in what we may term the intermediate process for getting the hydrochloric acid which is to provide the chlorine for chlorination of the aluminum oxide. This variation of the intermediate steps to produce the chlorinating agent, characterized by the specific decomposition of the sulphate in the same reaction in which the chlorinating agency is formed, although coming generally under the features of this present application because the sulphate is decomposed before chlorination, is specifically the subject matter of the identified application Serial No. 646,559. There are further variations of this intermediate process that will further appear.

Further, with regard to any of the methods here explained, the carbon may be introduced to the system in retort 10 instead of in the last retort, and may, in any case, be introduced in gaseous, liquid or solid form. After the sulphate has been decomposed it may be sprayed with hydrocarbons in any retort and thereby impregnated with carbonaceous matter, or the oxide may be sprayed with oil vapors, the retort being kept hot enough to decompose the vapors and deposit carbon. Then this impregnated oxide may be taken to retort 43; or the last reaction may, if desired, be carried on in retort 10 by introducing the chlorine there. If the oil or oil vapors are introduced into the same retort that the chlorine is subsequently passed into, the excess of oil vapors may be removed, before introducing chlorine, by passing a neutral gas through the retort. And, in fact, by having a sufficient number of retorts 10, the last reaction (VII) may be carried on there in any of the methods here described. And, the temperature of the oxide in retort 10 being about the same as that required for chlorination, that same temperature may be maintained, and the carbon and chlorine introduced and chlorination accomplished, without the necessity of reheating the oxide. Wherever the last reaction is carried on, the oxide may be impregnated with carbon as here described, either previous to or during the introduction of chlorine. Furthermore, we may so impregnate the oxide with hydrocarbon liquids or vapors somewhat in excess of the chlorine reaction requirements; and then the final chloride product will contain some condensed oil and be somewhat sticky and cokey and semi-liquid, less liable to deterioration, but not at all objectionable for use in oil distilling processes.

Although we thus prefer to use hydrocarbons, to supply the carbon for the chlorination step; any form of carbon may be used, or any carbon carrying gas may be substituted for hydrocarbon gas or vapor, so far as the general aspect of our process is concerned.

As an illustration of the application of this process to original materials other than pure aluminum sulphate, we will give an illustration of this application to alunite. It will be understood of course, from what we have said, that the process may be applied to various ores that carry aluminum sulphate, together with other things, whether chemically combined with the sulphate or not. Alunite is a good illustration of a material wherein the aluminum sulphate is chemically combined with other compounds. The formula for alunite may be written:

$$K_2O_3.Al_2O_3.4SO_3.6H_2O.$$

This ore is heated as hereinbefore described to such a temperature as to dehydrate it and as to drive off the $SO_3$ content which is not united with $K_2O$ content. The ore may be looked upon as being double sulphate of potassium and aluminum; and the $SO_3$ content of the aluminum sulphate is driven off. As a result of such heating, which may be carried on in such retorts as indicated at 10 in the drawings, and as hereinbefore referred to, there remains a substance that is made up of aluminum oxide and soluble potassium sulphate. The potassium sulphate is then leached out of the calcined residue; and then the remaining aluminum oxide is again dried before it is mixed with the proper proportion of carbon and chlorinated. The chlorination may be carried on in any of the manners hereinbefore described. It will be seen that the operations on alunite are thus substantially what they are on aluminum sulphate alone, only with the addition of leaching out the potassium sulphate and re-drying the oxide.

Furthermore chlorine for the chlorination operation may be obtained, in any of the various manners hereinbefore described, by using the $SO_3$ content of the original ore that has been driven off in the decomposing operation. It will not be necessary to go into the details of these steps as they have been fully described before. Other characteristic aluminum and sulphur carrying ores that may be used in the process are Alunogen, $Al_2O_3.3SO_3.18H_2O$
Aluminite, $Al_2O_3.SO_3.9H_2O$ It will be understood that, although we have here now stated various forms of process, that we have given these various forms by way of illustration only; and that the process may be varied in other manners and still be within the scope of the invention as expressed in the subjoined claims. For instance, various combinations or arrangements of the various steps herein set out may be made by selecting certain steps from the one or more of the methods herein stated and certain other steps from one or more of other methods herein stated; but it is unnecessary and would be burdensome to specifically state all of the possible methods that might be thus worked out.

Having described a preferred form of our invention, we claim:

1. A process that includes dehydrating and decomposing aluminum sulphate to obtain aluminum oxide and then chlorinating the resulting oxide to form anhydrous aluminum chloride.

2. A process, that includes decomposing anhydrous aluminum sulphate to obtain aluminum oxide and then chlorinating the resulting oxide to form anhydrous aluminum chloride.

3. A process that includes decomposing anhydrous aluminum sulphate with heat to form aluminum oxide and then chlorinating the resulting oxide to form anhydrous aluminum chloride.

4. A process that includes decomposing aluminum sulphate to form aluminum oxide, then chlorinating the resulting oxide in the presence of carbon to form anhydrous aluminum chloride.

5. A process that includes decomposing aluminum sulphate to form aluminum oxide, then mixing the resulting oxide with carbon and treating the mixture with chlorine to form anhydrous aluminum chloride.

6. A process that includes decomposing aluminum sulphate to form aluminum oxide, then impregnating the resulting oxide with carbon in excess of the amount required for chlorinating, and then chlorinating the so treated oxide to form anhydrous aluminum chloride mixed with carbon.

7. A process that includes decomposing aluminum sulphate by heating to form aluminum oxide, then chlorinating the oxide in the presence of carbon at a temperature of about 600° C. or more to form anhydrous aluminum chloride.

8. A process that includes decomposing aluminum sulphate to aluminum oxide at a temperature of about 600° C. or more, and then chlorinating the oxide in the presence of carbon while holding the oxide at substantially the same temperature.

9. A process, that includes dehydrating aluminum sulphate and decomposing it to aluminum oxide, then mixing the oxide with carbon by treating it with hydrocarbon to impregnate it with carbonaceous matter, then chlorinating the so treated oxide.

10. A process that includes dehydrating aluminum sulphate and decomposing it to aluminum oxide, then mixing the oxide with carbon by treating it while heated with hydrocarbon to impregnate it with carbonaceous matter, then chlorinating the so treated oxide.

11. A process that includes dehydrating aluminum sulphate and decomposing it to aluminum oxide, then mixing the oxide with carbon by treating it with hydrocarbon to impregnate it with carbonaceous matter in excess of the carbon required for chlorinating, then chlorinating the so treated oxide to form anhydrous aluminum chloride impregnated with the excess of hydrocarbon.

12. A process that includes dehydrating aluminum sulphate and decomposing it to aluminum oxide, then chlorinating the oxide in the presence of hydrocarbons to furnish carbon for the chlorinating action.

In witness that we claim the foregoing we have hereunto subscribed our names this 7th day of June, 1923.

HENRY I. LEA.
CLIFFORD W. HUMPHREY.